United States Patent
Braun et al.

[11] Patent Number: 5,129,581
[45] Date of Patent: Jul. 14, 1992

[54] NOZZLE FOR MIXING AND DISPENSING REDUCED CFC AND NON-CFC FOAMS

[75] Inventors: Robert Braun, New Lenox, Ill.; Gary Grunauer, Highland, Ind.

[73] Assignee: Insta-Foam Products, Inc., Joliet, Ill.

[21] Appl. No.: 694,249

[22] Filed: May 1, 1991

[51] Int. Cl.$^5$ .............................. B05B 7/04
[52] U.S. Cl. ........................ 239/414; 239/432; 239/602
[58] Field of Search .............. 239/304, 414, 432, 589, 239/601

[56] References Cited

U.S. PATENT DOCUMENTS

| | | |
|---|---|---|
| 3,559,890 | 2/1971 | Brooks .............. 239/304 |
| 3,633,795 | 1/1972 | Brooks .............. 239/304 |
| 3,784,110 | 1/1974 | Brooks . |
| 3,795,364 | 3/1974 | Kattner ............. 239/432 |
| 4,117,551 | 9/1978 | Brooks . |
| 4,193,546 | 3/1980 | Hetherington et al. ...... 239/432 |
| 4,458,831 | 7/1984 | Holleran et al. . |
| 4,603,813 | 8/1986 | Luegering . |
| 4,676,437 | 6/1987 | Brown . |
| 4,762,253 | 8/1988 | Palmert ............. 239/414 |
| 4,925,107 | 5/1990 | Brown .............. 239/414 |

OTHER PUBLICATIONS

Fomo Products Nozzle.

Primary Examiner—Andres Kashnikow
Assistant Examiner—Lesley D. Morris
Attorney, Agent, or Firm—Lockwood, Alex, Fitzgibbon & Cummings

[57] ABSTRACT

A mixing and dispensing nozzle adapted for attachment to an associated two or more component liquid dispensing gun for mixing and dispensing liquid foamable products which use reduced HFC, CFC or non-CFC or HFC foaming agents. The nozzle includes an internal mixing chamber having a mixing chamber outlet member which provides an outlet for foam mixed within the nozzle mixing chamber. The outlet tube has a tip portion with a re-entrant portion which extends rearwardly to define a generally V-shaped groove having an included angle.

26 Claims, 2 Drawing Sheets

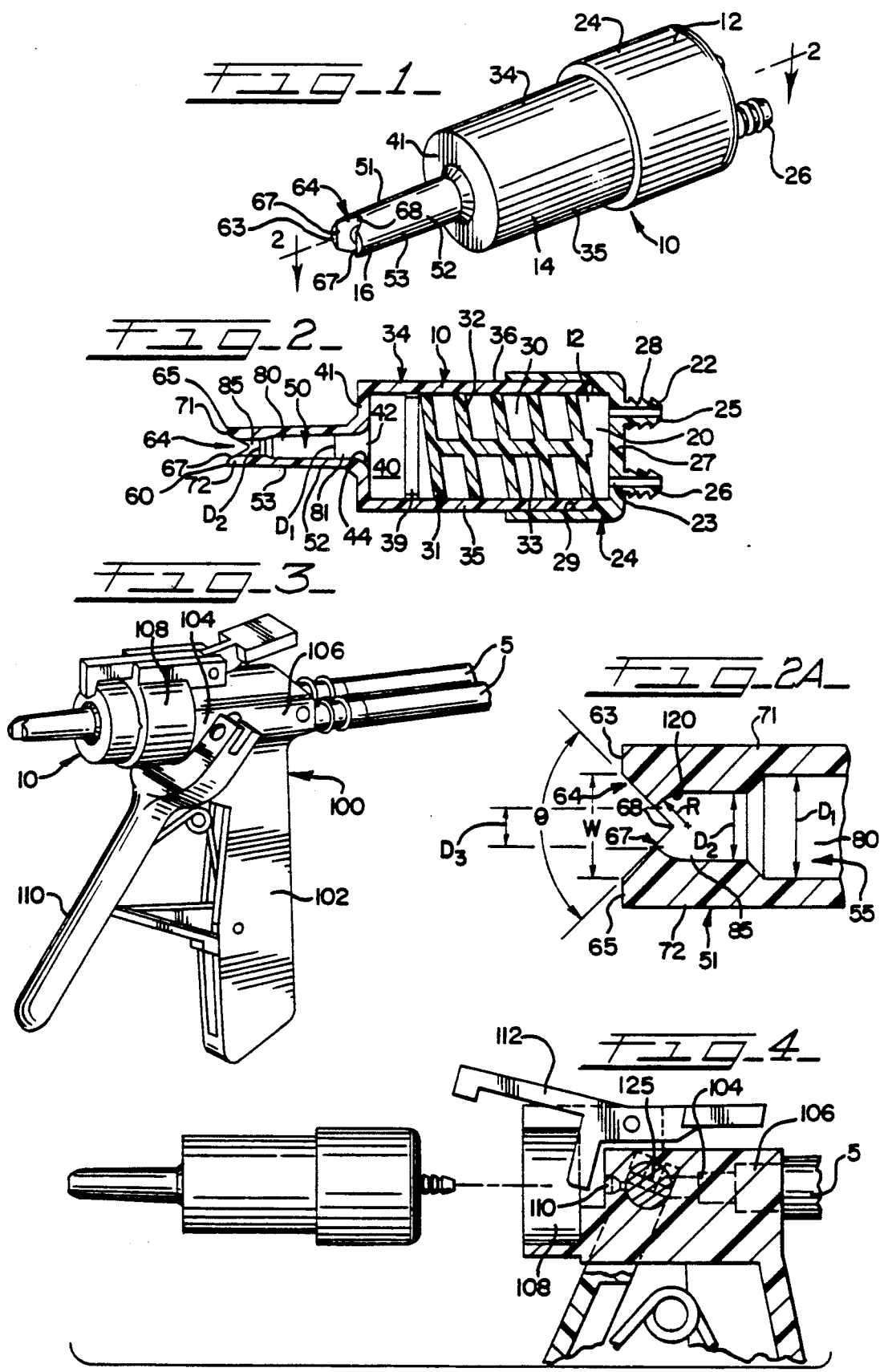

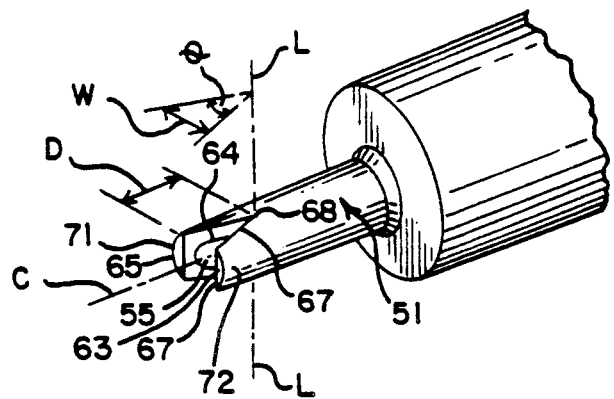
FIG-5-
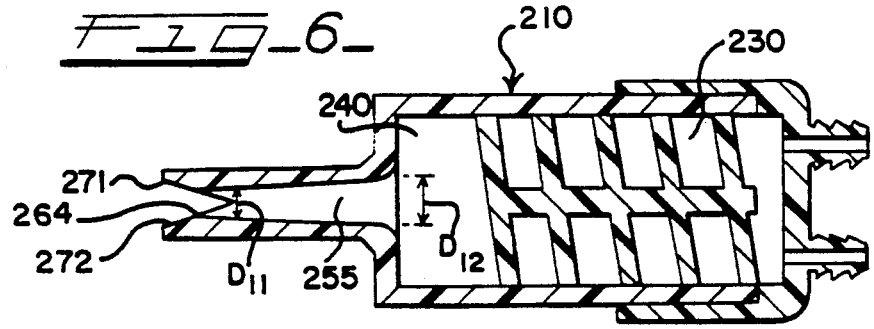
FIG-6-
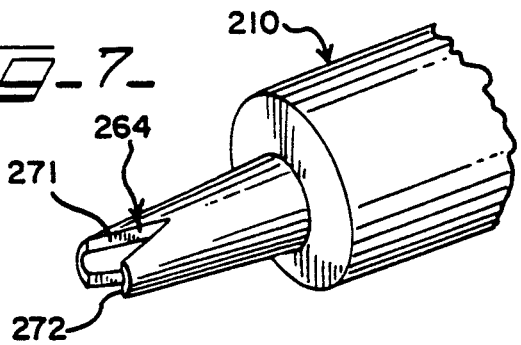
FIG-7-
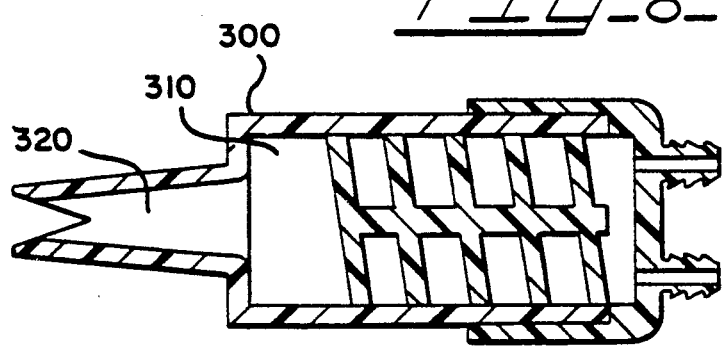
FIG-8-

NOZZLE FOR MIXING AND DISPENSING REDUCED CFC AND NON-CFC FOAMS

BACKGROUND AND SUMMARY OF THE PRESENT INVENTION

The present invention relates generally to disposable nozzles for mixing and dispensing a multi-component foam, and more particularly, to nozzles for mixing and dispensing two component foam systems using reduced chlorofluorocarbons (CFC), chlorofluorocarbons (CFC), hydrochlorofluorocarbons (HCFC), hydrofluorocarbons or water or any combination of the above as foaming agents.

The use of urethane and similar expandable foams has increased over the years for numerous applications. Urethane foams are well known as having desirable characteristics useful for many applications, such as insulation. Urethane foams are also well known for their compatibility with low cost blowing agents which allow such foams to be applied by way of pressurized containers as well as their natural adhesive qualities which allow such foams to bond excellently to any number of substrates. Typically, urethane foams are the reaction product of two individual components, one being a foaming agent and the other being a resin. These two individual components when reacted together, give the resultant foam various chemical compositions, each such composition having significant utility in a particular application. Thus, urethane foams may be specially formulated to provide a final foam which is rigid, semi-rigid or flexible.

Closed cell urethane foams are best used in building and structural insulation while open cell urethane foams are best used for packaging or non-insulating purposes. Regardless of the cell structure, the urethane foam is formed by mixing the two or more individual foam components together when the components exit their respective containers by way of individual supply tubes leading to a foam application gun. The components can be provided in small containers such as aerosol cans, containing up to 1 or 2 pounds of each component, or can be large cylinders, containing up to 1000 or more pounds of each component.

The foam component containers are connected to a dispensing tool or gun whereby each component is conveyed from the container by a distinct supply tube into the dispensing gun, the two or more components are mixed together in a disposable member and the reacted foam is applied through a nozzle of the gun. The dispensing gun typically includes an inlet assembly having tubes or other supply means from the foam component containers, a body portion having a dispensing trigger or other suitable mechanism to dispense the foam, and a nozzle assembly having an opening from which the foam exits. In operation of such dispensing guns, the separate foam components exit from their respective containers and enter a mixing chamber to form the final desired urethane foam. During mixing, the separate components are blended to form the urethane foam which then exits the spray nozzle at the outlet opening. Such foam dispensing guns and spray nozzles therefor are disclosed in assignee's patents, U.S. Pat. No. 3,784,110, U.S. Pat. No. 4,603,813 and U.S. Pat. No. 4,925,107. For the most part, these patents describe nozzles which are disposable and insertable into a foam dispensing gun body to establish an area where the separate foam components may be thoroughly mixed together before exiting the gun through the spray nozzle. Such nozzle assemblies are inexpensive and may be ejected or thrown away when the foam application is completed.

The urethane foam components used in these spray guns and nozzles therefor are maintained in their separate containers often in a pressurized state, using common foaming agents such as chlorofluorocarbons. Chlorofluorocarbons, or CFC's, are fully halogenated hydrocarbons which have been demonstrated as being detrimental to the ozone layer of the atmosphere. These liquids and gases provide excellent dispersal of liquids in aerosol applications because of the back pressure developed thereby, but nevertheless are detrimental to the environment. In recognition of this problem, federal regulations are now mandating a forced reduction by industry in the amounts of CFC and other related, atmosphere-damaging propellants used in aerosol applications. The overall goal of these regulations is to totally eliminate the use of these propellants in the aerosol application industry.

In order to comply with these environmental regulations, the industry is reducing the amount of CFC used as a propellant in aerosol applications. The industry is also utilizing water-blown systems wherein water is contained within one foam component and reacts with another foam component, typically an isocyanate, to form carbon dioxide which, as it expands, provides the frothing agent. However, water-blown and reduced CFC foam spraying systems do not always develop a proper or optimum back pressure required to propel the mixed foam out of the spraying nozzle of the gun onto the substrate in an even pattern. When the back pressure is insufficient, the foam tends to drip from the spray nozzle of the gun and when the back pressure is too great, the foam tends to exit the nozzle unevenly which results in the formation of a generally non-uniform pattern on the substrate.

The present invention overcomes the above disadvantages by providing an improved foam spraying nozzle for use in spraying foams with reduced CFC or with non-CFC foaming agents, the nozzle having an internal mixing chamber disposed between a nozzle portion and an inlet portion and wherein the nozzle portion includes a tip member having a generally cylindrical sidewall which is interrupted by an angular re-entrant portion in the form of a V-shaped notch, which nozzle configuration permits a generally uniform spray pattern without heavy spots or dripping. The nozzle tip may also be provided with an internal bore having two distinct diameters, wherein the diameters of the nozzle tip decrease as they approach the V-shaped re-entrant portion.

Accordingly, it is an object of the present invention to provide an improved, disposable spray nozzle for use on foam dispensing equipment in which the nozzle has a nozzle tip with an angular re-entrant portion.

It is another object of the present invention to provide a spray mixing nozzle for use on foam dispensing systems which utilize low CFC foaming agents in which the spray nozzle has an angular re-entrant portion at its nozzle tip which overcomes the spraying disadvantages associated with low back pressures.

It is a further object of the present invention to provide a foam dispensing gun for use with either non-CFC, CFC or reduced CFC foam systems in which the gun has a disposable spray nozzle having an inlet end, an outlet end, an intermediate internal mixing chamber disposed therebetween, the outlet end including an elongated nozzle extension, the nozzle extension having first and second diameters, the first diameter portion being disposed forwardly of the mixing chamber and the second diameter portion being disposed forwardly of the first diameter portion, the nozzle extension further having an expanded outlet opening in the form of an angular re-entrant portion which expanded opening modifies the flow of foam out of the nozzle to effect a desired deposition pattern of the same.

It is yet a further object of the present invention to provide a spray nozzle for foam dispensing systems in which the foaming agent is a reduced CFC and in which the spray nozzle has an elongated outlet passage having two internal foam passages, each passage having a distinct diameter leading up to a re-entrant portion, the upstream section having a greater diameter than the downstream section which increases the velocity of the exiting foam as it passes through the downstream section, the downstream nozzle section having an angular re-entrant portion which contains an angle of between approximately 40° and approximately 120°, such that the expanded foam is sprayed out of the nozzle in a consistent, generally uniform application without the occurrence of "heavy" spots.

These and other objects of the present invention will become more readily apparent from a reading of the following detailed description taken in conjunction with the accompanying drawings wherein like reference numerals indicate like parts.

BRIEF DESCRIPTION OF THE DRAWINGS

In the course of this detailed description, reference will be made to the attached drawings in which:

FIG. 1 is a perspective view of a foam mixing and dispensing nozzle constructed in accordance with the principles of the present invention;

FIG. 2 is a cross-sectional view taken along line 2—2 of the nozzle of FIG. 1;

FIG. 2A is an enlarged cross-sectional view of the nozzle tip of FIG. 2;

FIG. 3 is a perspective view of a mixing and dispensing gun assembly showing the mixing and dispensing nozzle of FIG. 1 in place within the gun;

FIG. 4 is a fragmentary view, partly in section and partly in elevation showing the mixing and dispensing nozzle and the nozzle latching and ejection, element(s) in the unlocked position;

FIG. 5 is an enlarged frontal end view of the nozzle extension of the nozzle of FIG. 2;

FIG. 6 is a sectional view of a second embodiment of a nozzle constructed in accordance with the principles of the present invention;

FIG. 7 is an enlarged frontal view of the nozzle extension of the nozzle of FIG. 6; and FIG. 8 is a sectional view of a third embodiment of a nozzle constructed in accordance with the principles of the present invention.

DETAILED DESCRIPTION OF THE PREFERRED EMBODIMENTS

Referring now to FIG. 1, a foam mixing and dispensing gun nozzle 10 constructed in accordance with the principles of the present invention is shown. The nozzle 10 has an inlet portion 12, an intermediate body portion 14 and an outlet portion 16. As best shown in FIGS. 3 and 4, the nozzle 10 is adapted to fit into a gun assembly, generally designated 100, which includes a number of principal components such as a handle portion 102, a central body portion 104, a supply tube component passage housing 106, a nozzle receiving portion 108, and a trigger assembly 110. The gun body portion 104 may also include a nozzle latching and ejecting assembly 112 which holds the nozzles 10 of the present invention in place in the nozzle receiving portion 108 of the gun body 104. The gun body supply tube component passage housing 106 is adapted to receive and hold in place, a pair of supply tubes 5 which extend rearwardly from the gun body to separate foam component containers (not shown). These separate containers store the liquid components of the urethane foam in a pressurized or non-pressurized state. These two containers may be located within a carrier, also not shown, which may be easily carried by the user. The urethane foam components separately lead to the spray gun body 104 by the individual supply or connector, tubes 5 where the components are mixed and are then discharged or sprayed as a urethane foam.

In the following description, the terms "upstream" and "downstream" will be used to define the orientation of either one component of the spray gun or portion of the spray nozzle 10 to another gun component or nozzle portion. These terms refer to the direction of the flow of the foam component liquids through the spray gun 104 and the spray nozzle 10. Thus, the spray nozzle 10 is said to be downstream from the gun body 104 and the nozzle tip 51 is downstream of the nozzle body portion 34.

For controlling the flow of each separate foam component into the spray nozzle 10, one or more primary valves 125 may be located in the gun body 104 and disposed between the supply tube housing 106 and the nozzle receiving portion 108. These valves are normally biased into a closed position such as by valve springs (not shown) or other suitable means. The valves 125 are opened when the operator depresses the trigger assembly 110. When opened, the valves 125 permit the flow of the separate isocyanate components and resin solutions to enter the spray nozzle 10 through the inlet ports 22, 23 explained in greater detail below.

Turning now to the particular details of the nozzle 10, as shown in FIG. 2, the nozzle and in particular, the nozzle body portion thereof, can be seen to possess a generally cylindrical shape. The spray nozzle 10 of the present invention may be easily inserted into and removed from the nozzle receiving portion 108 of the spray gun 100 by way of the nozzle latching and ejecting assembly 112.

The nozzle assembly components include a generally cylindrical, central nozzle body portion 34 defined by an axially extending outer sidewall 35 extending between the nozzle inlet portion 12 and the nozzle outlet portion 16. The nozzle body portion 34 is assembled into a similarly generally cylindrical rear cap portion 24 which closes off the nozzle inlet portion 12. The rear cap portion 24 has two inlet ports 22, 23 which extend through the end wall 27 of the rear cap portion. The rear cap portion 24 is preferably dimensioned so that the outer sidewall 35 of the nozzle body portion 34 is contactingly and preferably, snugly, received within the rear cap portion 24. The interior wall 29 of the rear cap portion 24 is sealed to the outer surface 36 of the nozzle body portion outer sidewall 35 during assembly of the nozzle 10 such as by suitable adhesive means or plastics welding, to ensure that the nozzle body 34 will not become dislodged therefrom during use of the spray gun 100.

The nozzle 10 includes four internal chambers which are generally designated 20, 30, 40 and 50. The first chamber 20 is disposed within the rear cap portion 24 and defines an entry or inlet chamber 20 into which the two inlet ports 22, 23 open. These two inlet ports 22, 23 may have interfitting ribs 28 arranged on two exterior projections or nipples 25, 26 of the nozzle endwall, which projections are coaxial with the inlet ports 22, 23. These projections 25, 26 are adapted to be indexed into registrations with corresponding openings 110 in the nozzle receiving portion of the gun body 104 (FIG. 4) to establish a liquid and gas-tight relationship between the nozzle 10 and the gun 100. This fluid-tight relationship ensures that the mixing of the two liquid foam components entering the nozzle 10 through the inlet ports thereof will occur exclusively in the interior nozzle chambers. As such, the disposable spray nozzle is the only component of the spray gun 100 in which the foam components are mixed together. In this regard, if the operator of the spray gun 100 should cease spraying the gun 100 for any time substantially longer than the setting time of the mixed foam (typically one minute or less) without purging the mixed foam components from the nozzle 10, the foam contained within the nozzle body will harden and render the nozzle useless. In such circumstances, the nozzle 10 may simply be ejected from the spray gun 100 by way of the ejecting assembly 112 and a replacement nozzle may then be inserted into the gun body. Accordingly, the presence of a self-contained inlet chamber 20 and mixing chamber 30 is significant when the present invention is compared to spray nozzles which have no separately defined inlet chamber, but rather are screwed into a spray gun body cavity. In these screw-in type nozzles the liquid foam components may enter the nozzle and gun body portion in a mixed state and thus will harden, rendering removal and replacement of the nozzle an extremely difficult and arduous task.

An intermediate passage or mixing chamber is disposed generally downstream of and adjacent to the nozzle inlet chamber 20 such that the inlet ports 22, 23 and the inlet chamber 20 are in direct fluid communication with the mixing chamber 30. The mixing chamber 30 preferably includes a baffle unit 31 contained in place within the nozzle body portion outer sidewall 35 and which baffle unit 31 may include a helical member 32 axially extending around a center shaft 33. The baffle unit 31 imparts a controlled helical swirling or mixing action to the two liquid foam components entering the mixing chamber 30 from the separate component containers (not shown) which are linked to the inlet chamber 20 by way of supply tubes 5 and their associated inlet ports 22, 23. This baffle unit 31 also assists in properly blending the two liquid components which enter the inlet chamber 20 into a fully mixed liquid foam prior to passage from the mixing chamber 30 to the expansion or pre-discharge chamber 40. Typically, the baffle unit 31 may be a separate element which is inserted into the mixing chamber 30 prior to assembly of the rear cap portion 24 onto the nozzle body portion 34. In this regard, the interior surface of the nozzle body portion mixing chamber 30 may contain an internal circumferential wall 39 which provides a ledge or stop against which the baffle unit abuts so that the passage of liquid foam components through the nozzle does not cause the baffle unit 31 to shift forwardly in the nozzle 10. Alternatively, the baffle unit 31 may be integrally molded into the nozzle body portion 34.

A pre-discharge chamber 40 is disposed generally downstream of and adjacent to the mixing chamber baffle unit 31. This expansion chamber 40 is defined by the nozzle body portion sidewall 35 and a front endwall 41. This endwall 41 includes an opening 42 disposed generally centrally therein. The opening 42 typically has a reduced diameter when compared to the diameter of the mixing chamber 30. This opening 42 defines the beginning of a nozzle chamber 50 disposed in the nozzle tip 51, through which the mixed and expanded foam passes as it travels from the expansion chamber 40, out of the nozzle 10 by way of the nozzle tip 51. The portions of the endwall 41 which surround the opening 42 may be rounded as at 44 such that they possess a preselected radius to reduce the likelihood that the transition at the created at the opening 42 presents any obstructions to the flow of the foam as it passes from the chamber into the opening 42.

The nozzle tip 51 includes an elongated, axially extending nozzle member 52 having a generally cylindrical sidewall 53. The nozzle member 52 extends forwardly from the mixing chamber endwall 41 to a nozzle tip outlet 60 and the nozzle sidewall 53 thereof defines a central nozzle foam passage 55. In an important aspect of the present invention, the nozzle tip 51 has a generally angular re-entrant portion 64 proximate to and in contact with the nozzle tip front end 65. This angular re-entrant portion 64 begins at the outermost endwall 63 of the nozzle tip 51 and extends rearwardly along a longitudinal axis of the nozzle foam passage 55.

As shown best in FIGS. 2 and 5, the nozzle re-entrant portion 64 may include a pair of V-shaped grooves 67 which are generally aligned together along their vertices 68. Each of the V-shaped grooves 67 which constitute a re-entrant portion 64 includes a pair of opposing sidewalls 71, 72 which extend generally rearwardly of the endwall 63 and can be considered to terminate or meet at a common re-entrant portion vertex 68. The re-entrant opposed sidewalls 71, 72 thereby define a nozzle angle $\theta$ (FIGS. 2A and 5) therebetween which begins at the vertex 68 and extends away from the longitudinal centerline C of the nozzle tip 51. As shown in FIGS. 2A and 5, the two interior vertices 68 of the V-shaped grooves 67 are preferably aligned such that a line L drawn through them intersects the centerline C of the nozzle tip 51 and its associated foam passage 55. However, it will be understood due to manufacturing tolerances, especially those encountered in plastics molding, that the location of the vertices 68 may deviate partially from strict alignment with the centerline. In embodiments where the foam passageway 55 is generally cylindrical, such as the nozzle 10 shown in FIGS. 1–5, the configuration of the nozzle foam passage 55 taken in section along the face of the opposing sidewalls, will generally be elliptical.

Similarly, in embodiments wherein the nozzle foam passage 255 is tapered or conical, such as that shown in FIGS. 6 and 7, the configuration of the foam passage 255 taken in section along the face of each of the opposing sidewalls 271 and 272 of the re-entrant portion 264 will be generally parabolic in shape. (FIG. 7)

During development and testing of the nozzle 10, the shape and dimensions of the re-entrant portion 64 were varied in order to obtain optimum performance of the nozzle 10 whereby the foam was discharged in a desirable pattern. It has been found through such testing that the nozzle angle θ chosen should be from between approximately 40° and approximately 120° to obtain desired results. Particularly, re-entrant portions having included angles between approximately 50° and 90° give preferred results. The angle chosen to define this re-entrant portion serves to enhance the flow characteristics of the foam as it exits out of the nozzle tip 51 as distinguished from nozzles in the art which contain one or more notches in which the purpose of the notch is to direct the flow exiting from the nozzle sideways for application of foam in tight spaces. In order to obtain re-entrant portions having these angles, the axial or longitudinal depth D of the V-grooves 67 should be approximately 0.082 inches. Similarly, the V-shaped grooves 67 will then also have a preferable width or opening dimension W between the open ends of the opposing sidewalls 71 and 72 thereof which vary between approximately 0.059 inches and approximately 0.284 inches. For the angular re-entrant portion having a preferred included angle of 50°, the D dimension should be approximately 0.082 inches and the W dimension should be approximately 0.076 inches, while for an angular re-entrant portion having a preferred included angle of 90°, the respective D and W dimensions should be approximately 0.082 inches and approximately 0.164 inches.

During operation, as the mixed fluid foam components pass into the nozzle passage 55 are mixed in the mixing chamber 30 and pass through the expansion chamber 40 into the nozzle chamber 50, it encounters the re-entrant portion(s) 64 of the nozzle tip 51. A sufficiently large back pressure builds up in the nozzle foam passage 55, and the reduced diameter portions thereof which cause the foam to properly exit the re-entrant portion 64 and disperse in an acceptable desired pattern. While it is not known exactly why such a reduced CFC and non-CFC propellants work effectively with the re-entrant nozzle 10, and the invention is not intended to be limited to any particular theory or method of operation, it is believed that the desired dispersal of the foam obtained from nozzles of the present invention are attributable to the re-entrant portion(s) and the sidewalls thereof which compel the foam to exit the nozzle 10 forwardly and angularly thereto.

Additionally, the nozzle foam passage 55 may be generally non-uniform, in that it may include two separate internal portions 80, 85 which have differing diameters. The rearward portion 81 of the nozzle passage 55 typically may have a first diameter, $D_1$, which is significantly less than the diameter of the nozzle body mixing and/or expansion chambers 30, 40. A portion 85 of the nozzle passage 55 ahead of the rearward nozzle portion 80 may have a second nozzle diameter $D_2$, which is less than the diameter of the first nozzle portion 80. The nozzle foam passage 55, which extends through both different diametrical portion 80, 85 of the nozzle may be either generally cylindrical as shown in FIGS. 1-2, 2A and 5 or approximately conical in configuration (FIGS. 6 and 7).

In actual practice it has been found that where the first nozzle diameter $D_1$ has a dimension of approximately 0.170 inches, a reduction in cross-sectional area between the nozzle first diameter 80 and the nozzle second diameter 85 of approximately 34% which yields a second nozzle diameter $D_2$ of approximately 0.112 inches and which gives acceptable results. The use of such a reduced diameter portion is particularly advantageous in that the reduced cross-sectional area of the forward portion 85 of the nozzle passage 55 will impart a greater velocity to the foam, passing through the nozzle passage as compared to the first nozzle portion 80. This increased velocity assists the re-entrant portion 64 in substantially atomizing all of the exiting foam to impart the desired fine mist pattern of deposition desired.

As shown best in FIG. 2A, the nozzle second diameter portion 85 may terminate in a rounded or "bullet"-like front end portion 120, the radial dimension, R, of which is located upstream of, or behind, the vertex 68 of the re-entrant portion 64. This rounded portion 120 further constricts the foam passing through it and may thus be considered as a third diameter portion $D_3$ of the nozzle. In this regard, the internal radius R may be set back approximately 10% of the width of the nozzle opening, or approximately 0.017 inches when the re-entrant angle id approximately 90 and the width of the same is 0.170 inches.

As shown in the nozzle embodiment 210 illustrated in FIGS. 6, the nozzle foam passage 255 may also have a generally non-cylindrical configuration, such as a gradual taper. In such instances, the foam passage 255 is generally conical. In this regard, the nozzle foam passage 255 will have a first diameter $D_{11}$ proximate to its nozzle tip 251 which is significantly less than diameter, $D_{12}$, of the nozzle body mixing and/or expansion chambers 230, 240. Additionally, as illustrated in FIG. 8, the nozzle 300 may have a first axial passage 310 which is generally cylindrical and a second axial passage 320 downstream of the first passage which second axial passage is generally conical or tapered.

It will be appreciated that the embodiments of the present invention that have been discussed herein are merely illustrative of a few applications of the principles of the invention. Numerous modifications may be made by those skilled in the art without departing from the true spirit and scope of the invention.

We claim:

1. A mixing and dispensing nozzle adapted for attachment to an associated two component liquid dispensing gun for mixing and dispensing liquid foamable products in which the liquid foamable products include reduced chlorofluorocarbons, chlorofluorocarbons and non-chlorofluorocarbons, as foaming agents, the nozzle comprising: an inlet end, an outlet end, the inlet end opening into an intermediate passage, by way of at least one inlet port, the intermediate passage extending between said inlet end and said outlet end, said intermediate passage providing an area of said nozzle for the expansion of foamable materials passing therethrough, said nozzle outlet end extending between said nozzle intermediate passage and an elongated nozzle outlet tube extending coaxially from said intermediate passage, the nozzle outlet tube having an internal bore extending axially therethrough and defining an exit passage for expanded foam to exit from said nozzle, said foam exit passageway being defined by a sidewall of said nozzle outlet tube, said nozzle outlet tube further including a generally angular re-entrant portion disposed adjacent to an endwall of said nozzle outlet tube.

2. The mixing and dispensing nozzle of claim 1, wherein said intermediate passage includes a mixing chamber having means for expanding foamable materials, including a baffle unit disposed within said mixing chamber, the baffle unit having helical vanes thereon, said helical vanes being arranged about a center element extending generally axially of said mixing chamber and imparting a swirling action to said liquid foamable product.

3. The mixing and dispensing nozzle of claim 1, wherein the nozzle inlet end includes a pair of spaced-apart inlet ports opening into said mixing chamber, said spaced-apart inlet ports further including a pair of inlet ports, the inlet ports including a pair of nipples extending axially outwardly from said nozzle inlet end, the nipples having interior passages communicating with said inlet ports and said mixing chamber.

4. The mixing and dispensing nozzle of claim 1, wherein said nozzle outlet tube sidewall is generally cylindrical and said foam exit passageway includes two internal bore portions of differing diameters, the first of said two internal bores having a diameter which is less than a diameter of said mixing chamber, the second portion of said two internal bore portions having a diameter which is less than the diameter of said first portion, the second bore portion being disposed downstream of said first bore portion.

5. The mixing and dispensing nozzle of claim 1, wherein said nozzle outlet tube angular re-entrant portion includes a pair of spaced-apart V-shaped notches, each of said notches having an included angle disposed between surrounding portions of said nozzle outlet tube endwall, said spaced-apart V-shaped notches further being aligned together along common vertices of said included angle, said included angle being between approximately 40° and approximately 120°, said foam exit passageway including three distinct internal bore portions, the first internal bore portion having a first passage diameter, the second internal bore portion having a second passage diameter which is less than said first passage diameter, the third internal bore portion being disposed downstream of said second internal bore portion and being defined by a radius internal of said foam exit passageway, the radius being disposed upstream of the common vertices of said V-shaped notches.

6. The mixing and dispensing nozzle of claim 5, wherein said included angle falls between approximately 50° and 90°.

7. The mixing and dispensing nozzle of claim 1, wherein said angular re-entrant portion contains an acute angle included between two opposing nozzle outlet tube sidewall portions, the included angle being between approximately 40° and approximately 120°.

8. The mixing and dispensing nozzle of claim 1, wherein said angular re-entrant portion forms an acute angle of approximately 90° which is included between two separate, opposing nozzle outlet tube sidewall portion.

9. The mixing and dispensing nozzle of claim 5, wherein said V-shaped notches are defined by a pair of opposing sidewall portions which meet at a common vertex, the vertex defining said included angle of between approximately 40° and approximately 120°, the depth of the vertex being between approximately 0.082 inches.

10. The mixing and dispensing nozzle of claim 1, wherein the foaming agent is a hydrochlorocarbon (HCFC).

11. The mixing and dispensing nozzle of claim 1, wherein said nozzle outlet has a generally cylindrical endface disposed in a generally cylindrical outlet region, the outlet region having a generally cylindrical sidewall with an endface, the endface being interrupted by a V-shaped groove.

12. The mixing and dispensing nozzle of claim 11, wherein said V-shaped groove has an included angle of between 40° and 120°.

13. The mixing and dispensing nozzle of claim 1, wherein said nozzle outlet tube sidewall is generally conical and said foam exit passageway has a generally tapered cross-sectional configuration, said foam exit passageway further including a first tapered portion having a first average diameter and a second tapered portion having a second average diameter, the first portion average diameter being greater than the second portion average diameter.

14. The mixing and dispensing nozzle of claim 1, wherein a portion of said foam exit passageway has a generally tapered cross-section.

15. A detachable nozzle for use in conjunction with a foam dispensing gun in which the foam is mixed and is dispersed from the nozzle in a spray, said nozzle comprising: a generally cylindrical rear cap portion, the rear cap portion including a pair of spaced-apart inlet ports adapted to engage means for conveying liquid foam components into said nozzle, said nozzle including an elongated, generally cylindrical mixing portion, the mixing portion having means for mixing liquid foam components therein, said mixing portion being seated within said rear cap portion, said nozzle further including an elongated outlet portion coaxially communicating with said mixing portion, the elongated outlet portion terminating in an outlet opening, the outlet opening being defined by a generally cylindrical outlet opening endwall, the outlet opening endwall being interrupted by a re-entrant portion includes a V-shaped groove extending from said outlet opening endwall rearwardly toward said rear cap portion, the V-shaped groove forming an included angle between opposing sidewalls of said V-shaped groove, the included angle being between approximately 40° and approximately 120°.

16. The detachable nozzle of claim 15, wherein the V-shaped groove included angle is approximately 90°.

17. The detachable nozzle of claim 15, wherein said re-entrant portion includes a pair of opposed V-shaped grooves opening at said outlet opening and extending rearwardly along said outlet portion toward said rear cap portion, each one of said pair of angular grooves terminating in a vertex.

18. The detachable nozzle of claim 17, wherein each vertex of said pair of opposed angular grooves is generally aligned with each other and with a longitudinal axis of said nozzle.

19. The detachable nozzle of claim 15, wherein said outlet portion includes a generally cylindrical foam outlet passage extending axially therethrough, the foam outlet passage having a first passage portion having a first diameter and a second passage portion having a second diameter, said second diameter being less than said first diameter, said outlet passage further including a third passage portion having a general diameter which is less than said second diameter.

20. The detachable nozzle of claim 15, wherein said foam outlet portion includes a generally tapered foam outlet passage having a foam entrance and a foam exit, the foam exit having a diameter which is less than a diameter of said foam entrance.

21. The nozzle of claim 15, wherein said outlet portion includes a foam outlet passage extending generally centrally through said outlet portion, the foam outlet passage having a generally tapered configuration, said foam outlet passage having a first tapered section having a first average diameter and a second tapered section having a second average diameter, the first average diameter being greater than the second average diameter.

22. The nozzle of claim 15, wherein said nozzle outlet re-entrant portion two opposing sidewalls meet together at a common vertex, said re-entrant portion having a longitudinal depth of about approximately 0.082 inches and an opening of between approximately 0.059 inches and approximately 0.284 inches.

23. A disposable mixing and spray nozzle for use in a foam dispensing gun which receives two or more separate liquid components from supply sources into a mixing chamber where the two liquid components are mixed together to form an expanded urethane foam which cures into an expanded, hardened mass after said two components are mixed together, the dispensing gun having spray nozzle latching and receiving means, the spray nozzle comprising, in combination:

an elongated nozzle body portion disposed between a nozzle inlet portion and a nozzle outlet portion;

the nozzle inlet portion including a pair of inlet ports adapted to communicate with the nozzle body portion in a fluid-tight relationship, means for supplying said two liquid components to said spray nozzle, the inlet ports further communicating with an inlet chamber;

the nozzle body portion including a mixing chamber disposed adjacent to and downstream of said inlet chamber, the mixing chamber being defined by a nozzle body portion sidewall, said mixing chamber further including means for expanding and mixing said two liquid components into a liquid foamable product, the expansion and mixing means including a baffle unit, the baffle unit having at least one helical vane thereon which extends longitudinally within said mixing chamber for a preselected distance, the baffle unit imparting a swirling action to said liquid foamable product;

the nozzle outlet portion being disposed adjacent to and downstream of said nozzle body portion, said nozzle outlet portion having a sidewall defining an elongated axial passage extending therethrough and between said nozzle body portion and an exit of said nozzle outlet portion, said nozzle outlet portion axial passage communicating with said mixing chamber by way of an opening having a first diameter, said mixing chamber having a diameter greater than said axial passage first diameter, said nozzle outlet portion axial passage having a first axial passage portion and a second axial passage portion, the second axial passage portion being disposed adjacent to and downstream of the first axial passage, said second axial passage having an axial passage second diameter which is less than said axial passage first diameter;

said nozzle outlet portion further having a generally angular re-entrant portion disposed in an outer endwall thereof, the angular re-entrant portion including a generally V-shaped groove defined by opposing groove walls, the generally V-shaped groove defining an acute angle included between the opposing groove walls, the included angle being between approximately 40° and approximately 120°, said opposing groove walls further defining a vertex of said V-shaped groove where said opposing groove walls meet, the vertex being substantially aligned with a longitudinal axis of said spray nozzle.

24. The disposable mixing and spray nozzle of claim 23, wherein said nozzle outlet first axial passage portion is generally cylindrical and said nozzle outlet second axial passage portion is generally cylindrical.

25. The disposable mixing and spray nozzle of claim 23, wherein said included acute angle is approximately 90° and said V-shaped groove has a depth of approximately 0.082 inches and an opening of approximately 0.164 inches.

26. The disposable mixing and spray nozzle of claim 23, wherein said included acute angle is approximately 50° and said V-shaped groove has a depth of approximately 0.182 inches and an opening of approximately 0.076 inches.

* * * * *